Jan. 29, 1963  J. P. GLENN  3,075,244
MANUFACTURE OF ARTICLES FROM POWDERED MATERIALS
Filed July 23, 1959
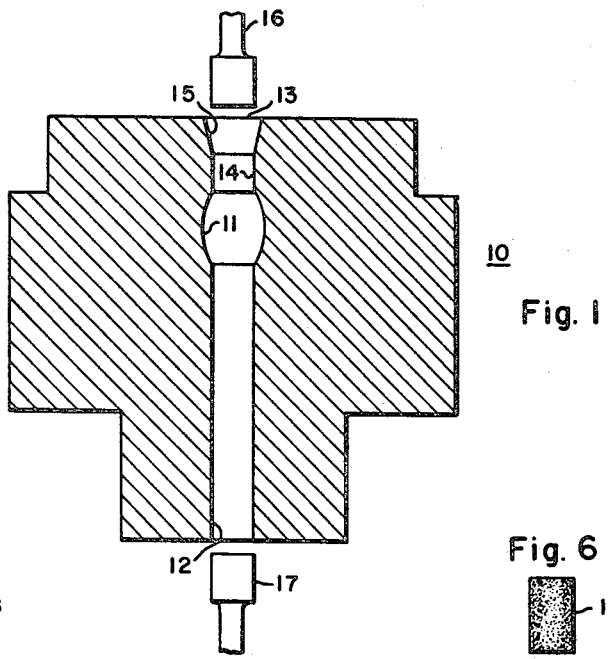
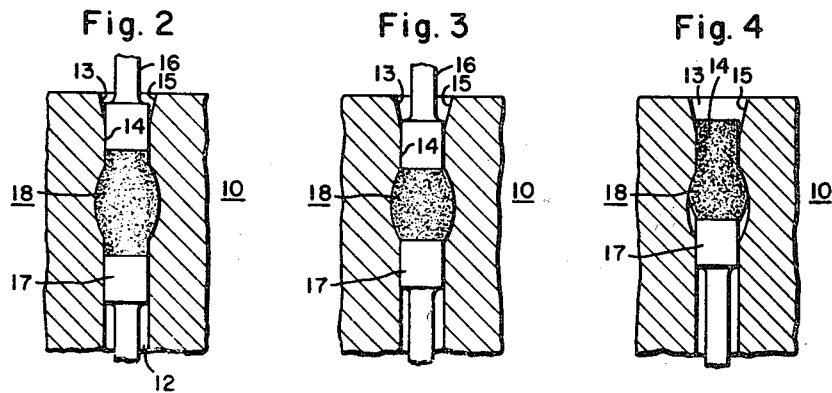
WITNESSES
INVENTOR
James P. Glenn
BY
ATTORNEY

United States Patent Office

3,075,244
Patented Jan. 29, 1963

3,075,244
MANUFACTURE OF ARTICLES FROM
POWDERED MATERIALS
James P. Glenn, Lynchburg, Va., assignor to Westinghouse Electric Corporation, East Pittsburgh, Pa., a corporation of Pennsylvania
Filed July 23, 1959, Ser. No. 829,122
8 Claims. (Cl. 18—16.5)

This invention relates to improvements in the manufacture of articles from powdered materials, and particularly, to improved means for compacting the powdered material to assure controlled shrinkage during sintering so that accurately dimensioned and sound finished sintered cylindrical articles may be produced therefrom.

In the manufacture of articles from powdered raw materials, the process generally includes compacting the powdered material into the desired shape, and thereafter sintering the shaped article. The articles as taken from the sintering furnace exhibit extensive shrinkage when compared with the dimensions of the "green" compact. This is the result of the partial fusion which occurs in the furnace. It is evident that the amount and the uniformity of this shrinkage will depend to a large extent upon the character of the green compact. If the article is loosely compacted with extensive voids and spaces, the shrinkage will be correspondingly greater, and if the density of the compact is not uniform, shrinkage will accordingly not be uniform.

Much effort has been expended to control the final dimensions of partially fused or sintered articles, for very often, it is desirable that the sintering be the last step in the manufacturing process, and the item as it comes from the furnace be in condition for use without machining, surface conditioning or other shaping.

It is known that when a powdered material is placed in a die cavity, wherein the die cavity is enclosed on all sides except the top, and pressure is applied upon the powdered material by a ram moving downwardly through the open top of the die, the powder compact will have a high density region adjacent the area of contact with the ram, and lower density regions with increasing distance from the ram face. Due to the non-uniform densities inherently produced by this method, only powdered compacts having low length-to-diameter ratios may be satisfactorily made in this way. Some improvement has been accomplished by employing a die having both an open top and an open bottom, with coacting rams operating through the top and bottom of the die. By this means, pressure is simultaneously exerted on two surfaces of the powdered material in the die cavity so that the powder compact obtained has regions of high density adjacent the top and bottom, and the density is lowest in the region adjacent the center of the longitudinal axis. This central region of low density becomes increasingly significant as the length of the powder compact is increased. Preferential shrinkage at the center of the compact reaches excessive proportions when the length-to-diameter ratio is greater than 1.

It is the object of this invention to provide a method for manufacturing from a powdered material accurately dimensioned and uniformly sound elongated articles of simple cross section wherein the powdered material is first compacted by oppositely disposed coacting rams in a barrel-shaped die cavity to form green compacts having a barrel shape, and thereafter ejecting the compacts from the die cavity by means of one of the rams, and then sintering the compacts.

It is another object of this invention to provide in a die for compacting powdered material, a barrel-shaped die cavity, and an extrusion surface adjacent thereto for deforming the powder compact as it is forced from the die.

Other objects and advantages of the invention will become apparent hereinafter.

For a better understanding of the nature and objects of the invention, reference should be had to the following detailed description and the drawing, in which:

FIGURE 1 is a sectional view of a die made in accordance with this invention;

FIGS. 2, 3 and 4 are other sectional views representing progressive steps in the production of a green compact;

FIG. 5 is a view in elevation of a green powder compact; and

FIG. 6 is a view in elevation of a sintered compact.

The present invention is directed to a method and apparatus for eliminating the undesirable effects of disproportional shrinkage in ceramic and metal compacts so that cylindrical compacts with a length-to-diameter ratio greater than 1 can be made and sintered with resultant straight sides. More specifically, the invention provides a die having a barrel-shaped die cavity therein which is open to oppositely disposed coacting rams, and wherein an extrusion throat is coaxial with the barrel-shaped die cavity. The powdered material is first compacted by the coacting rams in the barrel-shaped die cavity, the resulting barrel-shaped powder compact is then forced through the extrusion throat by one of the rams, and lastly, the barrel-shaped green compact is sintered in a furnace to obtain pellets having a substantially straight-sided cylindrical configuration and uniform density throughout.

Turning now to FIGURE 1, there is illustrated a die block 10 having a barrel-shaped die cavity 11 therein. The barreling of the die cavity is exaggerated in FIGURE 1 for clarity. A cylindrical passageway 12 communicates from the bottom of the die 10 to the bottom of the die cavity 11. A similar but shorter passageway 13 communicates from the top of the die to the top of the die cavity 11. The passageway 13, die cavity 11, and passageway 12 lie on the same longitudinal axis. Passageway 13 comprises two portions, an extrusion throat 14 immediately adjacent the upper end of die cavity 11 and of somewhat smaller diameter than the maximum diameter of the die cavity, and a funnel-shaped relief throat 15, connecting the upper surface of the die block 10 to the upper end of the extrusion throat 14. Powdered material to be compacted is poured through throat 15 into the cavity 11. A bottom ram 17 is reciprocable in the passageway 12, and an upper ram 16 is reciprocable in passageway 13.

With reference to FIGURES 2 through 6, a cycle of operation of the device of FIGURE 1 will now be described.

The bottom ram 17 is first raised in passageway 12 to the level shown in FIG. 2. The powdered material 18 is then charged through throat 15 into the die cavity in a predetermined amount, preferably somewhat above the top of the die cavity 11 and into the extrusion throat 14. The top ram 16 is then brought into the position shown in FIGURE 2. Pressure is then exerted by both rams simultaneously to compress the powdered material into the die cavity 11 as shown in FIGURE 3. Top ram 16 is next withdrawn from the die. Upward pressure is then exerted by bottom ram 17 to force the barrel-shaped powder compact 18 through the extrusion throat 14 as seen in FIGURE 4.

The barrel-shaped compact shown in FIGURE 3 will have regions of greatest density adjacent the ram faces, with the area or region of lowest density lying in a plane perpendicular to the longitudinal axis of the compact and approximately midway between the ram faces. Depending upon the amount of barreling, the ejection step carried out as indicated in FIGURE 4 may produce elastic deformation along the longitudinal axis of the compact sometimes associated with some plastic deformation.

At relatively low maximum barreling of the order of .002 inch for a 0.3 inch diameter compact only elastic deformation is observed, and the compact resumes the barrel shape essentially without dimensional change after being ejected by passage through the extension throat.

At greater barreling, of the order of .004 inch, some plastic deformation may occur, at least in the central regions where the diameter of the compact is greatest. In the case of plastic deformation an actual increase in density (and decrease in barrel diameter) in the plastically deformed region will be effected by the extrusion operation. However, the ejected compact before being sintered, in all cases will exhibit a substantial amount of barrel.

Where such partial plastic deformation takes place, the greatest additional compaction along the longitudinal axis of the compact occurs at the plane of lowest density previously mentioned, because it is in that region that the barrel-shaped compact has its greatest diameter. It is thus seen that in certain instances the combination of the barrel-shaped compact and the extrusion throat tends to provide increased density in the green compact where it is most needed. The resulting green compact 18, after extrusion ejection, as shown in FIG. 5, has a barreled configuration.

It will be understood that green compacts made in accordance with this invention will have a barrel shape to a greater or lesser degree depending upon the amount (if any) of plastic deformation. The shrinkage resulting from sintering will be greatest at the low-density large diameter central regions of the compact, and least at the small diameter high density end regions. This difference in amount of shrinkage will produce a cylindrical pellet having essentially straight sides.

It will be appreciated that due to small uncontrollable variations in materials, pressures, and other factors, the sintered pellets may depart slightly from a perfect cylindrical configuration. Usually the differences in diameter along the sides of a pellet are less than .001 inch, and can only be detected by careful micrometric measurements. However, compared to previous practice, the present invention results in a great improvement in attaining nearly perfect sintered cylindrical pellets.

The invention has demonstrated its merit in the production of uranium dioxide fuel pellets for use in nuclear reactors. These fuel pellets are placed in cylindrical tubes of metal. It is quite important that there be as close contact as possible between the walls of the pellets and the metal tube in order to conduct heat as efficiently as possible from the pellets, where it is generated during nuclear reactions, to the metal tube and thence to a heat absorbing medium.

Pellets suitable for use as fuels for nuclear reactors may be prepared from uranium dioxide powders and from about 1% to 2% by weight of a temporary organic binder, such as a metal soap, a resin, a long carbon chain alcohol or glycol, and derivatives of such alcohols and glycols, such as the acetates and formaldehydes thereof. One suitable powdered nuclear fuel material comprised approximately 1% polyvinyl acetate and approximately .25% calcium stearate as temporary binders, and the balance uranium dioxide. Another suitable material comprised 98% uranium dioxide and 2% solid polyethylene glycol of a molecular weight of above 1000. All parts are by weight. During sintering at a temperature of from 1300° C. to 1700° C. for from 4 to 24 hours the temporary organic binders volatilize and disappear from the compact. It has been determined that in a die for producing pellets of a diameter of the order of 0.3 inch, the maximum diameter of the barrel should exceed the compact diameter at the top and bottom by from .001 inch to .004 inch. It is preferred, however, that the maximum diameter of the barrel exceed the desired end diameter of the powder compact by a total of approximately .002 inch. Thus, for example, one series of green compacts had the following dimensions: length, .700 inch, end diameter, .349 inch, center diameter, .351 inch.

The following table presents actual results obtained for pellets fabricated to have final sintered diameters of .3065 inch and .3090 inch, respectively. It will be observed that the maximum deviation from the desired diameter amounted to .0005 inch.

TABLE I

*Uranium Dioxide Pellets From "Barrel Die" Having 0.002" Barrel*

[Final sintered dimensions in inches]

PELLETS MADE TO HAVE A FINAL DIAMETER OF 0.3065"

| Pellet No. | Length | Top End Diameter | Center Diameter | Bottom End Diameter |
|---|---|---|---|---|
| 1 | 0.655 | 0.3065 | 0.3065 | 0.3075 |
| 2 | 0.638 | 0.3065 | 0.3065 | 0.3070 |
| 3 | 0.638 | 0.3065 | 0.3065 | 0.3075 |

PELLETS MADE TO HAVE A FINAL DIAMETER OF 0.3090"

| 1 | 0.668 | 0.3090 | 0.3090 | 0.3090 |
|---|---|---|---|---|
| 2 | 0.664 | 0.3090 | 0.3090 | 0.3090 |
| 3 | 0.671 | 0.3085 | 0.3090 | 0.3090 |
| 4 | 0.670 | 0.3090 | 0.3090 | 0.3090 |
| 5 | 0.674 | 0.3090 | 0.3090 | 0.3090 |
| 6 | 0.671 | 0.3090 | 0.3090 | 0.3090 |
| 7 | 0.668 | 0.3090 | 0.3090 | 0.3090 |

The following table illustrates the average barrel or hourglass structure obtained after sintering uranium dioxide compacts having a diameter of approximately 0.3 inch and a length of between 0.6 to 0.7 inch, using various pressing pressures and thus obtaining varying green densities. The indicated pressing pressure in the table is the guage pressure in the hydraulic line of the press. A guage pressure reading of 90 to 100 lbs. is the equivalent of 50 to 60 tons per square inch at the compact.

| Batch | Pressing Pressure, lbs. | Average Green Density, gms./cc. | Average Sintered Density, gms./cc. | Average Barrel as Pressed,[1] Mils | Average Barrel or Hourglass After Sintering,[2] Mils |
|---|---|---|---|---|---|
| XD31W | 100 | 6.75 | 9.91 | 2.0 | 0.0 |
| XD31W | 92 | 6.66 | 9.93 | 2.0 | 0.0 |
| XD31W | 285 | 7.22 | 10.16 | 2.0 | +0.5 |
| XD31W | 400 | 7.63 | 10.21 | 2.0 | +1.0 |
| 10B1 | 100 | 6.35 | 10.00 | 2.0 | −1.0 |
| 10B1 | 150 | 6.45 | 9.98 | 2.0 | −1.0 |
| SMMD | about 100 | 6.90 | 10.14 | 2.0 | −0.5 12 hrs. @ 1,700° C. |
| SMMD | 200 | 7.30 | 10.26 | 2.0 | +0.5 |
| SMMD | 400 | 7.63 | 10.32 | 2.0 | +1.0 |

[1] Central diameter of pellet minus end diameter.
[2] Central diameter of pellet minus end diameter (average); + sign indicates barrel shape, − sign indicates hourglass.

It will be observed that when the 0.3 inch diameter compacts with .002 inch barrel are pressed at pressures to produce compacts of a density of from 6.6 to 7.1 gms./cc., the sintered pellets produced therefrom have almost perfect cylindrical shape, while those of densities below 6.6 have an hourglass shape after sintering, the amount of hourglass increasing with decreasing compact density, while compacts of a density exceeding 7.1 gms./cc. have a slight barrel after sintering. However, in all the above examples, the departure from perfection is quite small.

It is noted from Table II that deviation from the desired diameter is limited to a maximum of .001 inch. Other metal powders besides uranium dioxide may be compacted in a similar manner.

According to the present invention, a simple and effective method has been presented for manufacturing sintered, essentially straight-sided, long pellets from powdered materials. This method makes it possible to produce relatively long sintered powder compacts with a length-to-diameter ratio greater than 1 and a controlled diameter with a tolerance of ±.001 inch per 0.3 inch diameter. In addition, a die has been disclosed in which conjoint compacting and extrusion operations can be performed. The method and apparatus are not limited to a single class of materials, but may be used to form powder compacts or ceramic and metal powders. Examples are zircon, porcelain powders, silica, and silicates of aluminum, calcium and boron, and metals such as iron, tungsten, nickel and cobalt-nickel-iron known as Kovar. It is obvious that changes may be made in the dimensions disclosed above to suit the particular material undergoing compaction without departing from the scope of the invention.

In general, it will be understood that the above specification and drawings are exemplary and not limiting.

I claim as my invention:

1. In a method for producing from loose powdered material a cylinder of relatively uniform density having a length-to-diameter ratio greater than one, the steps of, exerting pressure on said loose powdered material in a suitable die cavity to form a barrel-shaped green compact, the barreling being from 1 to 4 mils per 0.3 inch diameter, extruding said barrel-shaped compact from said die through a circular orifice, whereby said compact is elastically deformed, and thereafter sintering said compact to form a cylinder having essentially straight sides and uniform density throughout.

2. A method for making a cylinder from a powdered metal oxide, comprising the steps of, charging an intimate mixture of metal oxide powder and a temporary bonding agent into a barrel-shaped die cavity, compressing said mixture between oppositely disposed coacting rams to form a barrel-shaped green compact, applying pressure to said compact by means of one of said rams to eject said compact from said die cavity through a die orifice capable of elastically deforming said barrel-shaped compact, said compact resuming its barrel shape after passing through said orifice, and heating said barrel-shaped compact to sinter the metal oxide and volatilize the bonding agent, whereby the shrinkage occurring during sintering is so distributed that the compact assumes a substantially cylindrical form.

3. In a method for producing from powdered uranium dioxide a cylinder of relatively uniform density having a length-to-diameter ratio greater than 1, the steps of, charging a sinterable powder mixture of uranium dioxide and from 1% to 2% temporary binder into a barrel-shaped die cavity, the barreling of the die cavity being approximately 2 mils per 0.3 inch diameter, compressing said powder mixture in said die cavity to a density of from 6.6 to 7.1 grams per cubic centimeter, ejecting the barrel-shaped compact from the die cavity through a circular orifice, and thereafter sintering said compact to form a cylinder having essentially straight sides.

4. A method for making cylindrical pellets of uranium dioxide of relatively uniform density, comprising the steps of, charging a sinterable powder mixture comprising about 1% polyvinyl alcohol, about 0.25% calcium stearate, and the balance uranium dioxide, into a barrel-shaped die cavity, compressing said powdered mixture between oppositely disposed coacting rams to form a barrel-shaped green compact, applying pressure to one end of said compact to force said compact from said die cavity through a die orifice having a diameter slightly less than the maximum diameter of said compact, thereby elastically deforming said compact, and thereafter sintering said compact to bond the uranium oxide powder, whereby the compact assumes a substantially cylindrical form as the result of shrinkage during sintering.

5. A method for making cylindrical pellets of uranium dioxide of relatively uniform density and having a length-to-diameter ratio greater than unity, comprising the steps of, charging a sinterable powder mixture comprising 98% uranium dioxide powder, and 2% polyethylene glycol, into a barrel-shaped die cavity, compressing said mixture to conform with the shape of said cavity by applying pressure simultaneously at opposite ends of said die cavity thereby producing a powder compact having a barrel-shaped configuration, forcing said powder compact from said cavity through a circular die orifice having a diameter less than said compact by applying pressure at one end only of said compact, and sintering said compact whereby said polyethylene glycol is volatilized and the uranium dioxide powder is bonded into a unitary structure and simultaneous shrinkage occurs along the longitudinal axis of the barrel-shaped compact to produce a substantially straight-sided cylindrical pellet.

6. In a press for compacting powdered material, a die having a barrel-shaped die cavity therein, a lower passageway in said die communicating with the bottom of said die cavity, an extrusion orifice in said die communicating with the top of said die cavity, a relief throat in said die contiguous with said extrusion orifice, said extrusion orifice and said relief throat constituting together an upper passageway, said upper passageway, said die cavity, and said lower passageway being aligned on a common longitudinal axis, a first ram reciprocable in said lower passageway, a second ram reciprocable in said upper passageway, the diameter of said barrel-shaped die cavity being slightly greater than the diameter of said extrusion orifice.

7. A method for making cylindrical pellets having a length-to-diameter ratio greater than one, comprising the steps of, compacting under pressure a quantity of said powdered material in a barrel-shaped die cavity, extruding the compact from said die cavity whereby some plastic deformation takes place along the longitudinal axis of the compact to form a green compact having a maximum diameter slightly less than that of the die cavity, and thereafter sintering the green compact to form a pellet having a substantially cylindrical form.

8. A method for making a cylinder from loose powdered material, comprising the steps of, forming under pressure a barrel-shaped compact having a length to diameter ratio greater than 1 from said loose powdered material, elastically deforming said barrel-shaped compact along the longitudinal axis thereof by extrusion and thereafter sintering said barrel-shaped compact to produce an essentially cylindrical body.

References Cited in the file of this patent

UNITED STATES PATENTS

| 1,510,745 | Montgomery | Oct. 7, 1924 |
| 1,684,984 | Claus | Sept. 18, 1928 |

FOREIGN PATENTS

| 1,056,991 | Germany | Mar. 6, 1959 |